United States Patent [19]

Kamoshita et al.

[11] Patent Number: 5,041,344
[45] Date of Patent: Aug. 20, 1991

[54] FUEL CELL COOLING DEVICE

[75] Inventors: Tomoyoshi Kamoshita; Toshio Hirota; Osamu Yamamoto; Kaoru Kondou; Takashi Ujile, all of Kanagawa, Japan

[73] Assignee: Fuji Electric Corporate Research and Development Ltd., Kanagawa, Japan

[21] Appl. No.: 498,466

[22] Filed: Mar. 22, 1990

Related U.S. Application Data

[63] Continuation of Ser. No. 332,370, Mar. 31, 1989, abandoned, which is a continuation of Ser. No. 4,248, Jan. 5, 1987, abandoned, which is a continuation of Ser. No. 808,562, Dec. 13, 1985, abandoned.

[30] Foreign Application Priority Data

Dec. 14, 1984 [JP] Japan .............................. 59-263905
Oct. 8, 1985 [JP] Japan .............................. 60-224321

[51] Int. Cl.$^5$ .............................................. H01M 8/04
[52] U.S. Cl. .............................................. 429/26
[58] Field of Search .................................. 429/26

[56] References Cited

U.S. PATENT DOCUMENTS 3,964,929 6/1976 Grevstad ............................. 429/26
3,969,145 7/1976 Grevstad et al. .................... 429/26

FOREIGN PATENT DOCUMENTS 0133775 8/1983 Japan .................................. 429/26

Primary Examiner—Donald L. Walton
Attorney, Agent, or Firm—Finnegan, Henderson, Farabow, Garrett, and Dunner

[57] ABSTRACT

A fuel cell cooling device includes a plurality of plate-like fuel cell units arranged in a vertical stack and having singly interspersed therein cooling plates. A main coolant pipe supplies coolant at a pressure above the saturation point thereof to the cooling plates through corresponding inlet cooling pipes. A throttle is provided in each inlet cooling pipe to produce a pressure drop such that coolant entering a cooling plate is at a pressure below the saturation point thereof.

2 Claims, 4 Drawing Sheets

FUEL CELL COOLING DEVICE

This application is a continuation of application Ser. No. 332,370, filed Mar. 31, 1989, abandoned, which is a continuation of application Ser. No. 004,248, filed Jan. 5, 1987, now abandoned, which is a continuation of application Ser. No. 808,562, filed Dec. 13, 1985, now abandoned.

FIELD OF THE INVENTION

The present invention relates to fuel cell cooling devices and particularly to a fuel cell cooling device of the kind in which a cell stack includes plate-like units and cooling plates each interposed between a group of a plurality of the units and a cooling medium that flows through paths formed in the cooling plates from a main cooling pipe to cool the cell stack by evaporation latent heat.

BACKGROUND OF THE INVENTION

A cell stack of a fuel cell is constituted by a plurality of stacked cell blocks and a plurality of cooling plates each formed with a cooling path and each interposed between adjacent ones of the cell blocks. Each of the cell blocks comprise a plurality of unit cells, and each unit cell is constituted by an electrolyte layer carrying electrolyte, a pair of porous fuel and oxidizing electrodes sandwiching the electrolyte layer therebetween, and a pair of plates provided on the respective outsides of the electrodes for supplying the electrodes with a fuel gas and an oxidizing gas for performing reaction. A manifold pipe that branches from an inlet cooling main pipe is arranged at the interposed cooling plates and is provided with small pipes communicating with the respective paths of the cooling plates. The respective paths of the cooling plates communicate at their outlet sides with an outlet cooling main pipe through small pipes and a manifold pipe similar to those at the inlet sides of the same.

Accordingly, heat generated by the operation of the fuel cell is removed to maintain the fuel cell at its running temperature by cooling water which is used as a cooling medium. The cooling water flows from the inlet cooling main pipe into the paths of the cooling plate and is discharged through the outlet cooling main pipe.

To perform such cooling, there have been known a pressure water cooling system and a boiling water cooling system. Compared with the boiling water cooling system, the pressure water cooling system requires a large quantity of cooling water and is less efficient because it requires auxiliary driving power. Accordingly, the boiling water cooling system has been used more often. The boiling water cooling system utilizes the evaporation latent heat of cooling water, so that only a small quantity of cooling water is required and the auxiliary driving power can be reduced.

Because the cooling plates of the cell stack are vertically stacked, however, the cooling water flowing in the respective cooling plates is different in pressure from each other due to the head difference of the cooling water produced by the difference of height of the respective cooling plates. Consequently uniform boiling cannot be obtained. Accordingly, there is a disadvantage that the respective cooling plates differ in cooling performance from each other. The problems will be further described by reference to the drawings.

In FIG. 7, a plurality of cooling plates, for example, cooling plates 1a, 1b and 1c are interposed among cell blocks to be stacked to a height of several meters. Cooling water is caused to flow through the cooling plates 1a, 1b and 1c in the direction of an arrow P from pipes 2a, 2b and 2c which branch from a pipe 21. The water is discharged through an outlet cooling main pipe 22 in the direction of an arrow Q. In this case, the cooling plates 1a, 1b and 1c are arranged in the highest, in the middle, and in the lowest positions, respectively. Accordingly, the pressures of the cooling water at the respective inlets of the cooling plates 1a and 1c produce a head difference H corresponding to the height of the stack.

FIG. 8 is a graph showing the pressures of the cooling water when the cooling water is caused to flow in the cooling plates 1a, 1b and 1c in FIG. 7. In FIG. 8, the abscissa indicates the flowing distance of the cooling water and the ordinate indicates the pressure of the cooling water.

In FIG. 8, polygonal lines A, B and C show the respective pressures of the cooling water caused to flow in the respective cooling plates 1a, 1b and 1c. The respective cooling water pressures decrease in the section from a branching point L of the branched pipes 2a, 2b and 2c to the respective inlets of the cooling plates 1a, 1b and 1c on the polygonal lines A, B and C because of pressure losses caused by the arrangement of the branched pipes. However, the pressures within these portion are represented by horizontal lines because the reductions of the pressures are negligible when compared with the pressures losses in the cooling water paths of the plates.

The pressures of the cooling water become $A_1$, $B_1$ and $C_1$ at the respective inlets of the cooling plates 1a, 1b and 1c. After the cooling water has passed through the cooling water paths in the cooling plates, the cooling water pressures becomes $A_2$, $B_2$, and $C_2$ at the respective outlets of the cooling plates. The pressure is $P_c$ at a flowing distance M in the outlet cooling main pipe 22 in which the cooling water is joined and through which the cooling water is discharged.

If the saturation pressure of the cooling water corresponding to the running temperature of the fuel cell is set to be $P_{S1}$ as shown in FIG. 8, the cooling plate 1a disposed at the highest position starts to boil in the vicinity of the inlet, while the boiling point moves downwards as the height of the cooling plate decreases. For example, the boiling point in the cooling plate 1c moves to a position $C_2$ in the vicinity of the outlet of the cooling plate. Accordingly, in the cooling plate 1c disposed at the lowest position, the rate of vapor caused by boiling is reduced so as to lower the cooling performance.

If the saturation pressure is set to be $P_{S2}$ in order to increase the rate of vaporization by making the starting point of boiling approach a position in the vicinity of the inlet of the cooling plate 1c disposed at the lowest position, the cooling water pressures in the pipe 2a of the cooling plate 1a and the manifold portion connected with the pipe 2a are subjected to a pressure level $P_{S2}$ so that the cooling water is likely to evaporate and flow into the cooling plate 1a through the pipe 2a in the form of a two-phase flow. However, the cooling water pressures in the pipes 2b and 2c of the respective cooling plates 1b and 1c are above $P_{S2}$, the water flows in the liquid phase into the cooling plates 1b and 1c. The boiling condition in the cooling plate 1a is different from those in the cooling plates 1b and 1c because of the difference of the state of flow, so that the rate of vaporization is different among the cooling plates and produces differences in cooling performance thereamong.

OBJECTS AND SUMMARY OF THE INVENTION

It is therefore an object of the present invention to eliminate the disadvantages in the prior art.

It is another object of the present invention to provide a fuel cell cooling device in which uniform cooling performance can be obtained among stacked cooling plates by making uniform the rate of vapor caused by boiling in the cooling plates.

The above and other objects are attained by a fuel cell cooling device including a plurality of plate-like units, a cooling plate interspersed therein, a main cooling pipe for supplying coolant, and a cooling pipe connecting the main cooling pipe to an inlet of the cooling plate to supply coolant at a pressure above the saturation point thereof, the improvement comprising a throttle provided in the cooling pipe between the main cooling pipe and the cooling plate to reduce the pressure of the coolant to a level below the saturation point of the coolant before the coolant is supplied to the inlet of the cooling plate.

BRIEF DESCRIPTION OF THE DRAWINGS

The manner by which the above objects and other objects, features, and advantages of the invention are attained will become more apparent from the following detailed description when considered in view of the drawings, wherein.

DETAILED DESCRIPTION OF THE PREFERRED EMBODIMENTS

Figure 1:
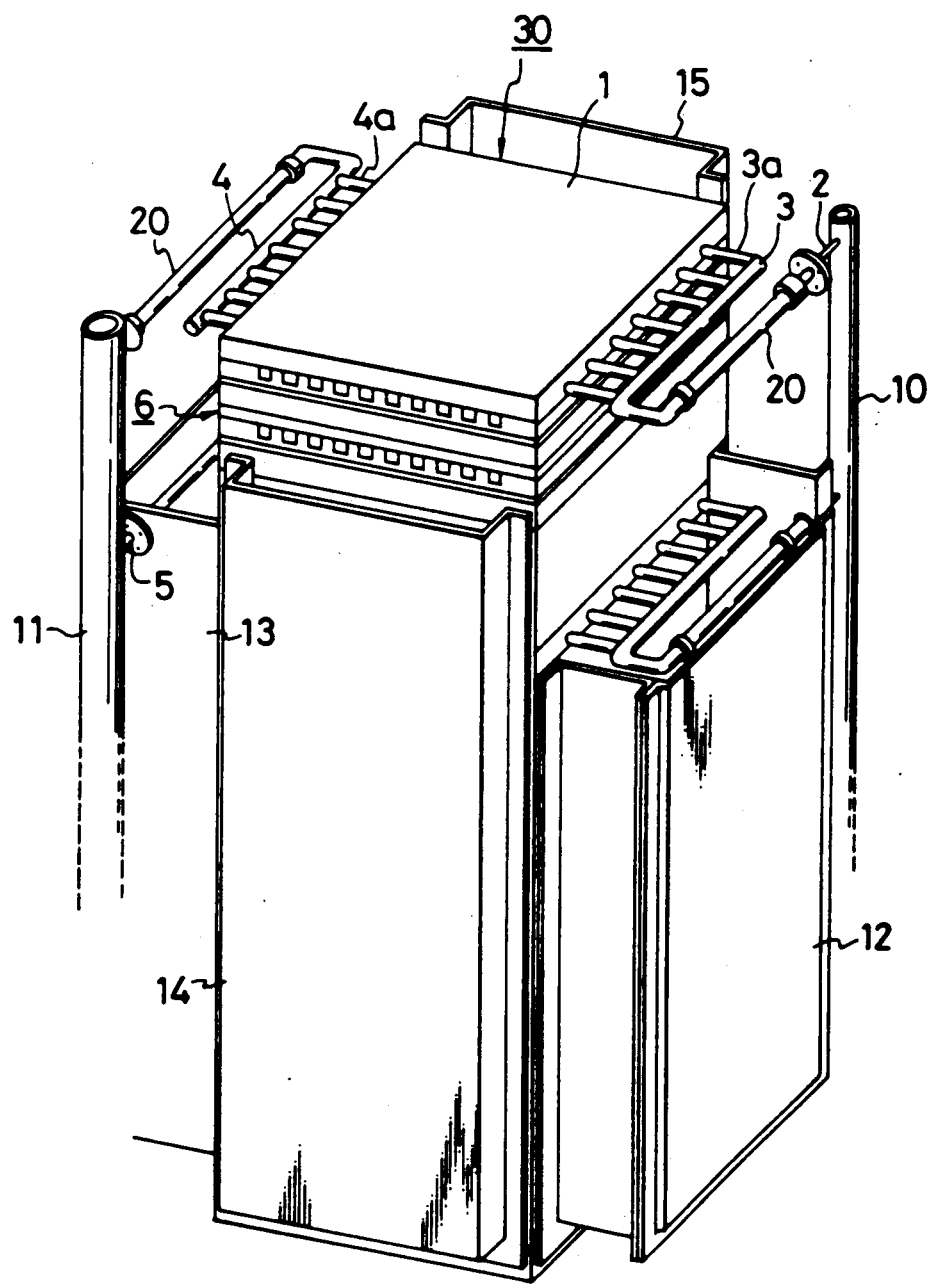
FIG. 1 is a perspective view of a cell stack constituted by cooling plates provided with cooling pipes in which throttles are inserted according to an embodiment of the present invention.

Referring to the drawings, FIG. 1 is a perspective view of a fuel cell provided with throttles in cooling pipes according to an embodiment of the present invention. The items in FIGS. 1, 2 and 4 which are the same as those in FIGS. 7 and 9 are referenced correspondingly. In FIG. 1, cooling plates 1 are vertically stacked with cell blocks 6 interposed therebetween, and are fastened by fastening plates (not shown) to constitute a cell stack 30. Flexible hoses 20 are connected with respective pipes 2 that branch from an inlet cooling main pipe 10. The cooling plates 1 are provided with small pipes 3a to make cooling water paths in the cooling plates 1 communicate with manifold pipes 3. The diameter of each of the pipes 2 is reduced to form a throttle.

The cooling plates 1 are connected with an outlet cooling main pipe 11 through manifold pipes 4 assembled with small pipes 4a communicating with the cooling water paths at the respective outlets of the cooling plates 1 and flexible hoses 20. A supply manifold 12 for supplying oxidizing gas to oxidizing electrodes of the cell blocks 6 is provided on one side of the cell stack 30, and an exhaust manifold 13 for discharging the oxidizing gas is disposed on the other side.

The flexible hoses 20, the manifold pipes 3, and the small pipes 3a among the cooling water pipes are arranged within the supply manifold 12. The small pipes 4a, the manifold pipes 4, and the flexible hoses 20 are arranged in the exhaust manifold 13. A fuel gas is supplied to the fuel electrodes by a supply manifold 14 for supplying the fuel gas and an exhaust manifold 15 is provided for discharging the fuel gas. The manifolds 14 and 15 are arranged on opposite side surfaces of the cell stack 30 each perpendicular to the direction along which the oxidizing gas is caused to flow.

During operation of the fuel cell, the oxidizing gas and the fuel gas for performing the reaction are caused to flow into the cell stack 30 through the supply manifolds 12 and 14, and are discharged from the exhaust manifolds 13 and 15, respectively. An electrochemical reaction among the cells in the cell stack 30 generates electricity. The heat generated at that time is cooled by cooling water flowing as a cooling medium into the cooling plates 1.

Figure 2:
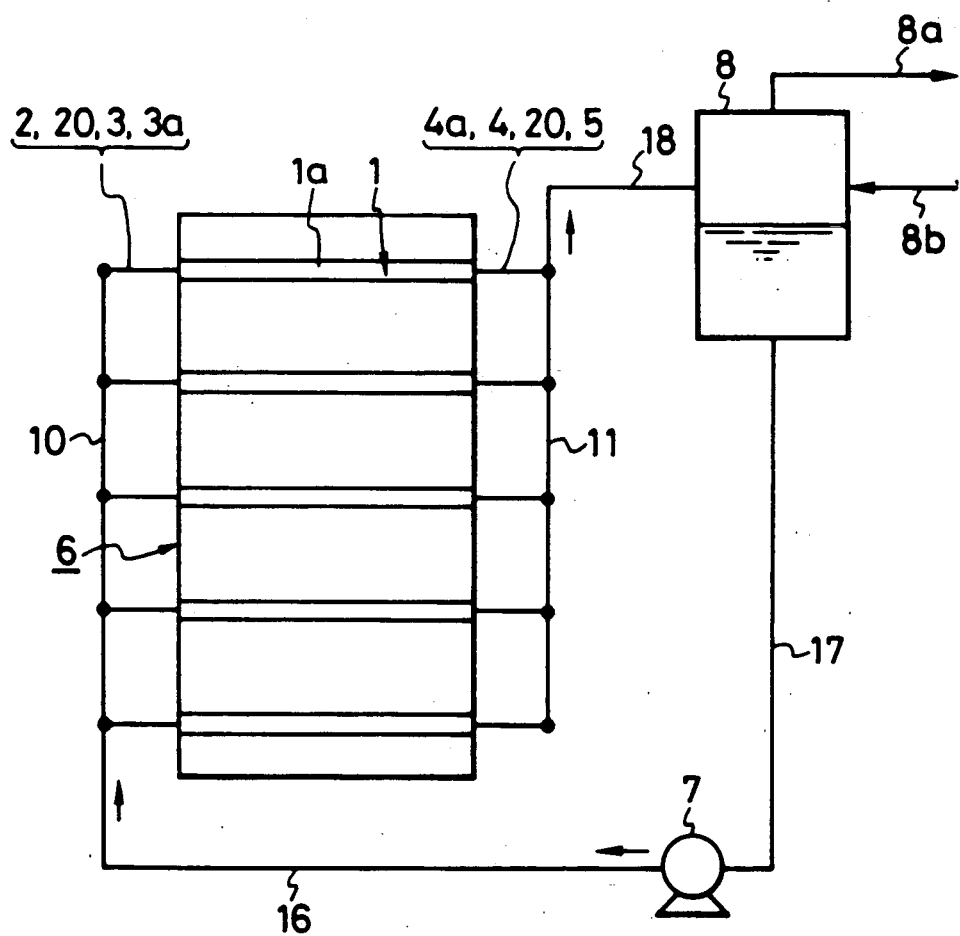
FIG. 2 is a schematic diagram of the cooling system of FIG. 1.

FIG. 2 is a diagram showing a cooling system in the arrangement of FIG. 1. In FIG. 2, a plurality of the cooling plates 1 are stacked with the cell blocks 6 interposed thereamong. The pipe paths constituted by the pipes 2, 20, 3 and 3a branch from the inlet cooling main pipe 10 and connect with the cooling water inlets of the cooling plates 1. The cooling water outlets of the cooling plates 1 are connected to the pipe paths constituted by the pipes 4a, 4, 20 and 5 which are connected to the outlet cooling main pipe 11. The inlet cooling main pipe 10 and a circulation pump 7, the outlet cooling main pipe 11 and a gas-liquid separator 8, and the gas-liquid separator 8 and the circulation pump 7 are connected respectively through pipe paths 16, 18 and 17. The gas-liquid separator 8 is provided with a vapor recovery pipe 8a and a cooling water supplement pipe 8b. The throttle pipes 2 are each made to have a pressure loss equal to or larger than a head difference between the respective cooling water inlets of the cooling plates disposed at the highest and the lowest positions.

In a cooling system arranged as described above, the cooling water in the gas-liquid separator 8 is led to the circulation pump 7 through the pipe path 17 and to the inlet cooling main pipe 10 through the pipe path 16. The water flows into the cooling water paths in the cooling plates 1 through the pipe paths constituted by the pipes 2, 20, 3 and 3a. The cooling water is then discharged to the gas-liquid separator 8 through the pipes 4a, 4, 20 and 5, and the pipe path 11. The vapor is recovered through the vapor recovery pipe 8a into the gas-liquid separator 8. On the other hand, the cooling water in the gas-liquid separator 8 is sent through the pipe path 17, so that the cooling operation is continued.

Because each of the pipes 2 branching from the inlet cooling main pipe 10 has such a pressure loss as described above, the rate of vaporization by boiling is made uniform among the cooling plates disposed between the highest and the lowest positions. Referring to the drawings, this point will be further described.

Figure 3:
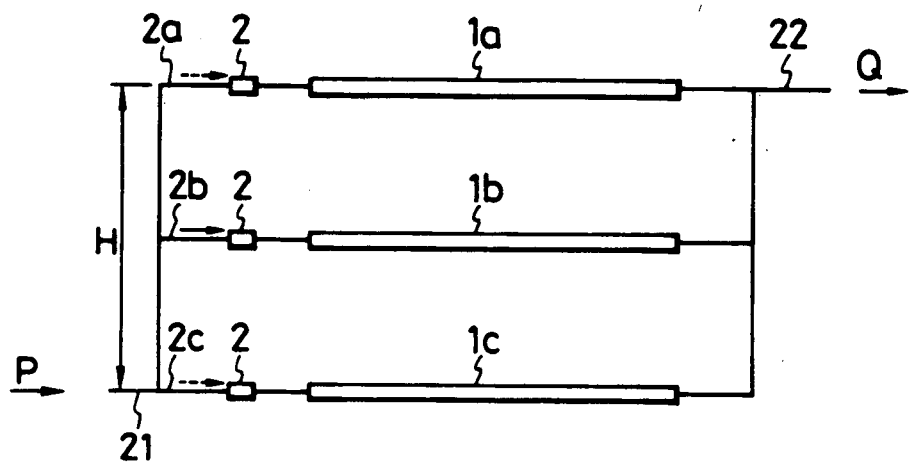
FIG. 3 is a schematic diagram of cooling systems having cooling plates in which throttles are inserted.

In FIG. 3, cooling plates 1a, 1b and 1c are respectively disposed at the highest position, the middle position, and the lowest position. The cooling water inlets of the cooling plates 1a, 1b and 1c are connected with pipes 2a, 2b and 2c, respectively, which branch from an inlet cooling pipe arrangement 21 and are provided with throttles 2. The respective cooling water outlets of the cooling plates 1a, 1b and 1c are connected with an outlet cooling pipe arrangement 22 through appropriate pipe paths. Each of the throttles 2 is constituted by a pipe which is reduced in diameter so as to provide a pressure loss equal to or larger than the head difference H of the cooling water between the cooling water inlets of the cooling plates 1a and 1c. The cooling water is caused to flow in the direction of an arrow P into the cooling plates 1a, 1b and 1c through the inlet cooling pipe arrangement 21. The outputs of the branch pipes 2a, 2b and 2c, the throttles 2, and the plates 1a, 1b and 1c are collected by the outlet cooling pipe arrangement 22 so as to be discharged in the direction of an arrow Q.

Figure 4:
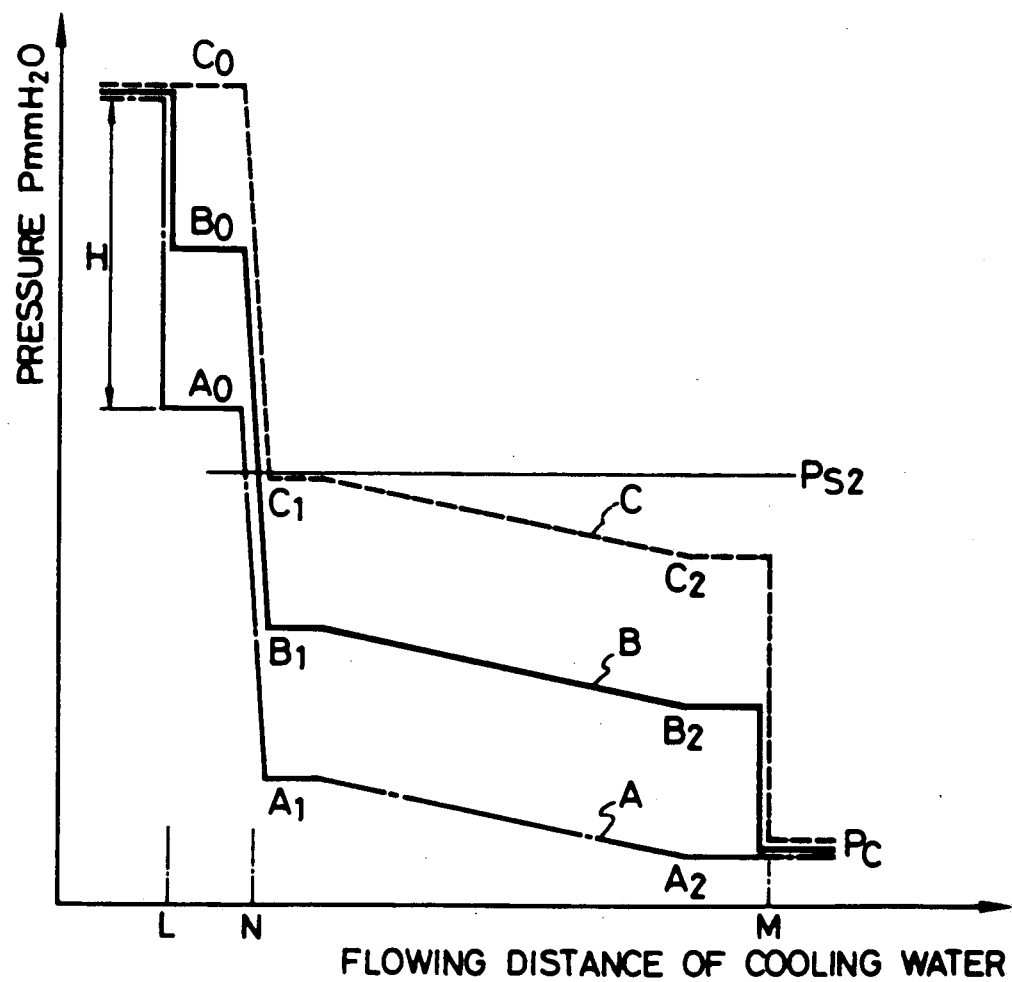
FIG. 4 is a graph showing the cooling water pressures when the cooling water is caused to flow into the cooling plates of FIG. 3, respectively.
Figure 5:
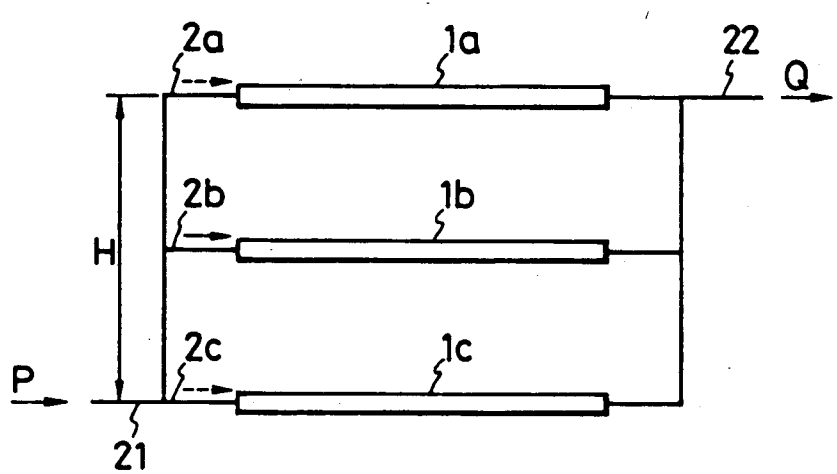
FIG. 5 is a diagram showing conventional cooling systems in the cooling plates.
Figure 6:
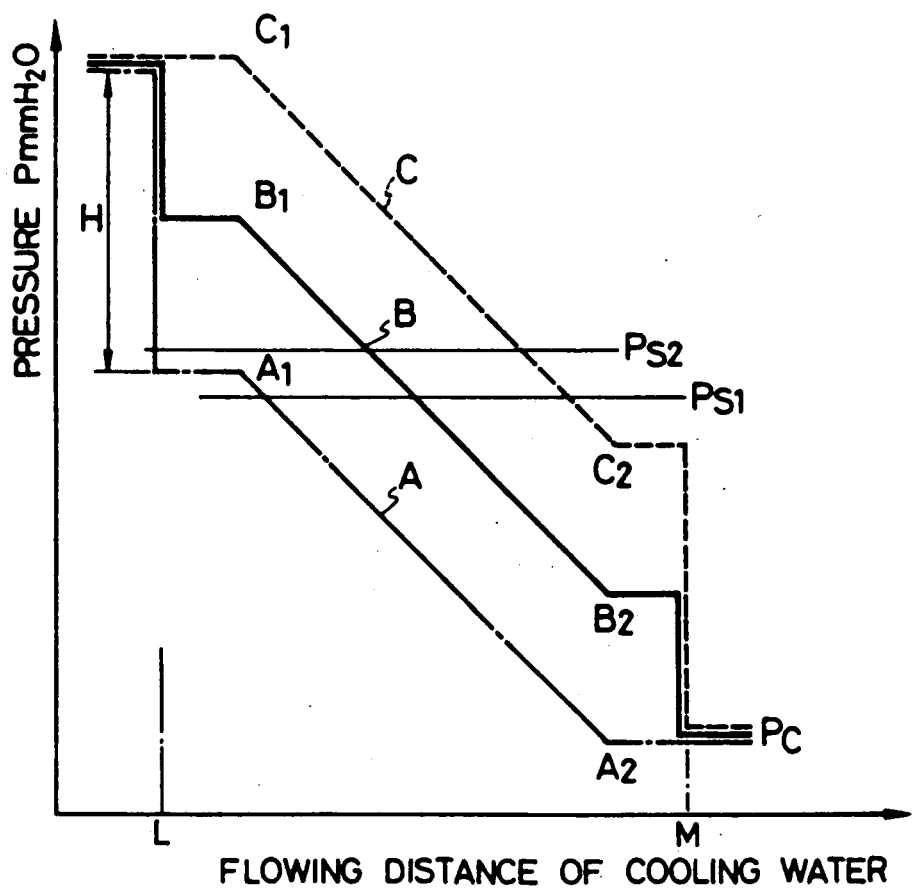
FIG. 6 is a graph showing the cooling water pressures when the cooling water is caused to flow into the cooling plates of FIG. 7, respectively.

FIG. 4 is a graph showing the respective pressures of the cooling water caused to flow in the above-mentioned cooling plates 1a, 1b and 1c, in which abscissa indicates the flowing distance of the cooling water and the ordinate indicates the pressure of the cooling water. Polygonal lines A, B and C show the cooling water pressures of the cooling plates 1a, 1b and 1c, respectively. As shown in the polygonal lines A, B and C, the respective pressures are $A_0$, $B_0$ and $C_0$ at the flow distance N that is before entering the respective throttles 2, and decrease to $A_1$, $B_1$ and $C_1$ at the outlets of the respective throttles 2 due to the pressure losses in the respective throttles 2 which are equal to or larger than the head difference H. The cooling water flows into the respective cooling plates 1a, 1b and 1c such that the respective pressures in the cooling plates 1a, 1b and 1c decrease to $A_2$, $B_2$ and $C_2$ at the respective outlets of the cooling plates and become $P_c$ in the outlet cooling pipe arrangement 22 through which the cooling water is discharged.

Accordingly, if the cooling water pressure is set such that the saturation pressure $P_{S2}$ of the cooling water corresponding to the running temperature is made to be a value between $A_0$ and $C_1$, the pressure of the cooling water supplied to all of the cooling plates is equal to or larger than $P_{S2}$ at the inlets of the respective throttles 2 so that the cooling water is in the liquid states. The pressures decrease to values equal to or lower than $P_{S2}$ after the cooling water has passed through the throttles 2. Accordingly, the throttles 2 lower the pressure of the cooling water to a point below $P_{S2}$ to permit the cooling water to be easily evaporated in the pipes 2a, 2b and 2c, so that a two-phase flow of cooling water and vapor is provided. Accordingly, the cooling water flowing in each of the respective cooling plates boils substantially in the same condition with each other due to the heat generation in the cells to make the rate of vapor generation and the flow quantities uniform so as to make uniform the cooling performance due to the evaporation latent heat.

What is claimed is:

1. A boiling water fuel cell cooling device for use in a vertical cell stack including a plurality of plate-like fuel cell units, and at least one full cell reactant supply manifold, the boiling water cooling device comprising:

a plurality of cooling plates interspersed between the fuel cell units and arranged in a vertical stack including a lowermost cooling plate and an uppermost cooling plate, each of said cooling plates including an inlet and an outlet;

a main coolant pipe for supplying coolant;

a plurality of inlet cooling pipes singly associated with said plurality of cooling plates, each of said inlet cooling pipes being mainly in said supply manifold and connecting said inlet of the associated cooling plate to said main coolant pipe, said main coolant pipe supplying coolant to said inlet cooling pipes at a pressure greater than the saturation pressure of the coolant;

a plurality of throttle means singly connected in said plurality of inlet cooling pipes near said main coolant pipe, each of said throttle means reducing the pressure of said coolant such that said coolant enters and traverses the supply manifold and said cooling plates at a pressure below the saturation point of said coolant; and a gas-liquid separator connected to the outlets of each of said plurality of cooling plates, said separator having a gas vapor exhaust port for exhausting vaporized coolant, and a liquid recirculation port for recirculating coolant from said gas-liquid separator to said main coolant pipe.

2. A method of cooling a boiling water fuel cell including a vertical stack of a plurality of plate-like fuel cell units and at least one fuel cell reactant supply manifold, the method comprising the steps of:

interspersing a plurality of cooling plates between said fuel cell units of the vertical fuel cell stack, the cooling plates including an uppermost cooling plate and a lowermost cooling plate, each of the cooling plates having an inlet and an outlet;

connecting each of said cooling plate inlets with a main coolant pipe through a plurality of inlet cooling pipes mainly in said supply manifold and singly associated with the plurality of cooling plates;

connecting throttle means in each of said inlet cooling pipes nearly the main coolant pipe;

supplying a liquid coolant to each of said throttle means in each of said inlet cooling pipes through said main coolant supply pipe at a pressure over the saturation point of said coolant;

reducing the pressure of the liquid coolant being supplied by said main coolant pipe to each of the cooling plates in the vertical cell stack with each of said throttle means to a pressure below the saturation point of the coolant;

passing said coolant from the throttle means through both said inlet cooling pipes in said supply manifold and said cooling plates in a two-phase mixture of liquid and gaseous coolant; and exhausting said coolant from each of said cooling plates through said cooling plate outlets.

* * * * *

UNITED STATES PATENT AND TRADEMARK OFFICE
CERTIFICATE OF CORRECTION

PATENT NO. : 5,041,344
DATED : August 20, 1991
INVENTOR(S) : Tomoyoshi Kamoshita et al.

It is certified that error appears in the above-identified patent and that said Letters Patent is hereby corrected as shown below:

On the title page, Inventors, change "Takashi Ujile" to --Takashi Ujiie--.

Claim 1, column 6, line 1, change "full" to --fuel--.

Signed and Sealed this

Twentieth Day of April, 1993

Attest:

MICHAEL K. KIRK

*Attesting Officer*     *Acting Commissioner of Patents and Trademarks*